Nov. 17, 1964 J. S. BARNETT 3,157,882
PULSE OPERATED CAMERA
Filed April 14, 1958 8 Sheets-Sheet 1
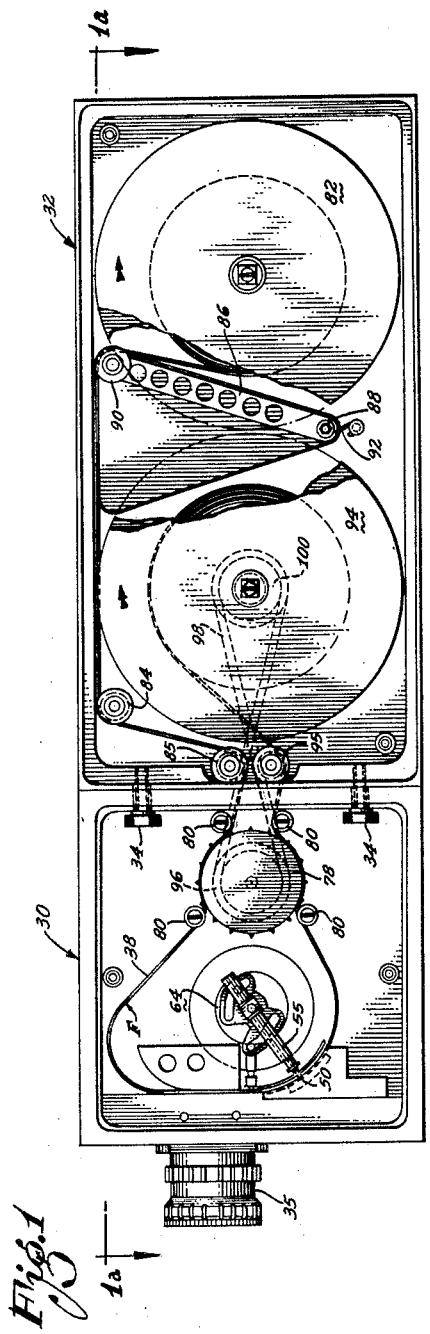
INVENTOR:
John S. Barnett Nov. 17, 1964  J. S. BARNETT  3,157,882
PULSE OPERATED CAMERA
Filed April 14, 1958  8 Sheets-Sheet 2

INVENTOR:
John S. Barnett

By Smyth & Roston
Attorneys

Nov. 17, 1964  J. S. BARNETT  3,157,882
PULSE OPERATED CAMERA

Filed April 14, 1958  8 Sheets-Sheet 3

INVENTOR:
John S. Barnett

Attorneys

Nov. 17, 1964

J. S. BARNETT 3,157,882

PULSE OPERATED CAMERA

Filed April 14, 1958

| Stage 1 | Stage 2 | Stage 3 | Stage 4 |
|---|---|---|---|
| ←—1st Solenoid Energized—→ | | ←Spring Return→ | |
| | ←—2nd Solenoid Energized—→ | | ←Spring Return→ |
| | Sprocket Feeds Film | | |
| Shutter OPENS | Shutter CLOSES | Extended Claw Shifts to Transport film | Pilot Pins Extend |
| Pilot Pins are Extended | Claw Extends | | Pressure Plate Lowers |
| Pressure Plate is Down | Pilot Pins Retract | | Claw Retracts |
| Retracted Claw Shifts | Pressure Plate Lifts | Spring Belt Releases Energy to Feed Increment of Film | |

Fig.11

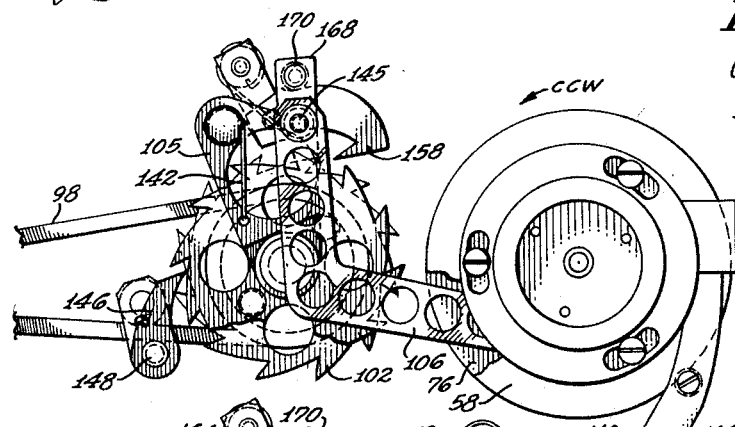

Fig.11a

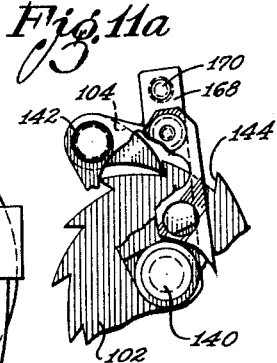

Fig.11b

INVENTOR
John S. Barnett

By Smyth & Roston
Attorneys

Nov. 17, 1964  J. S. BARNETT  3,157,882
PULSE OPERATED CAMERA
Filed April 14, 1958  8 Sheets-Sheet 5

INVENTOR
John S. Barnett
By Smyth & Roston
Attorneys

Nov. 17, 1964　　　　J. S. BARNETT　　　　3,157,882
PULSE OPERATED CAMERA
Filed April 14, 1958　　　　　　　　　　　　　　8 Sheets-Sheet 6
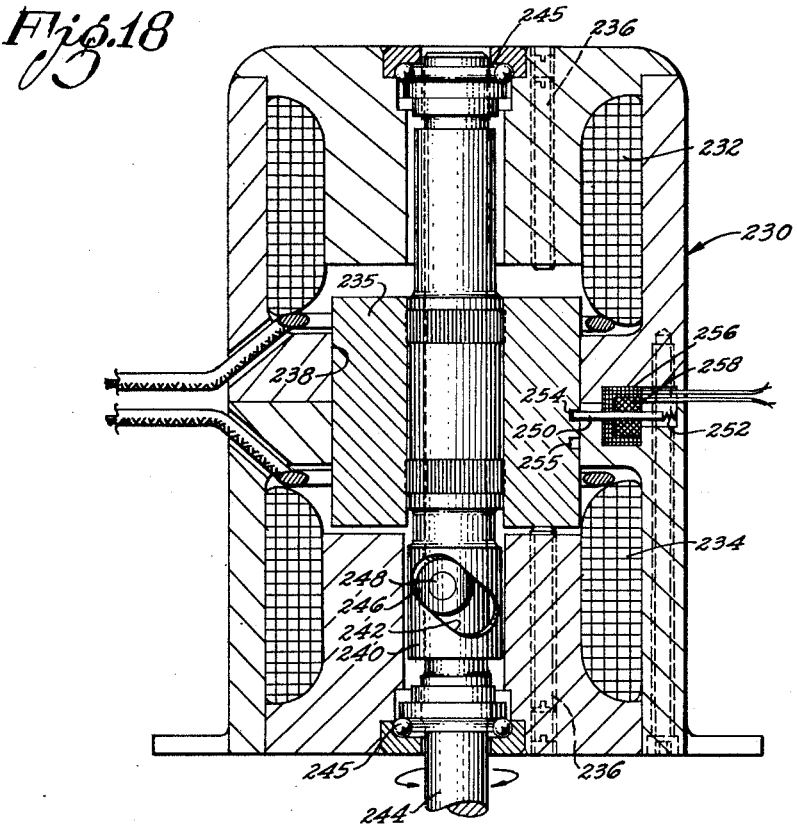
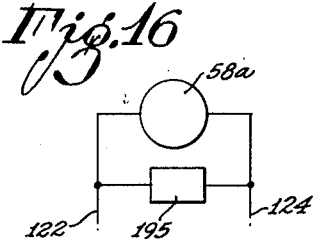
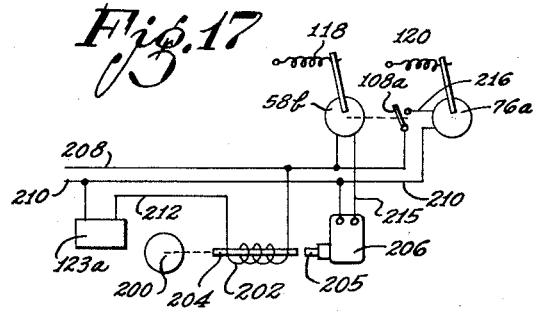
INVENTOR:
John S. Barnett
Attorneys

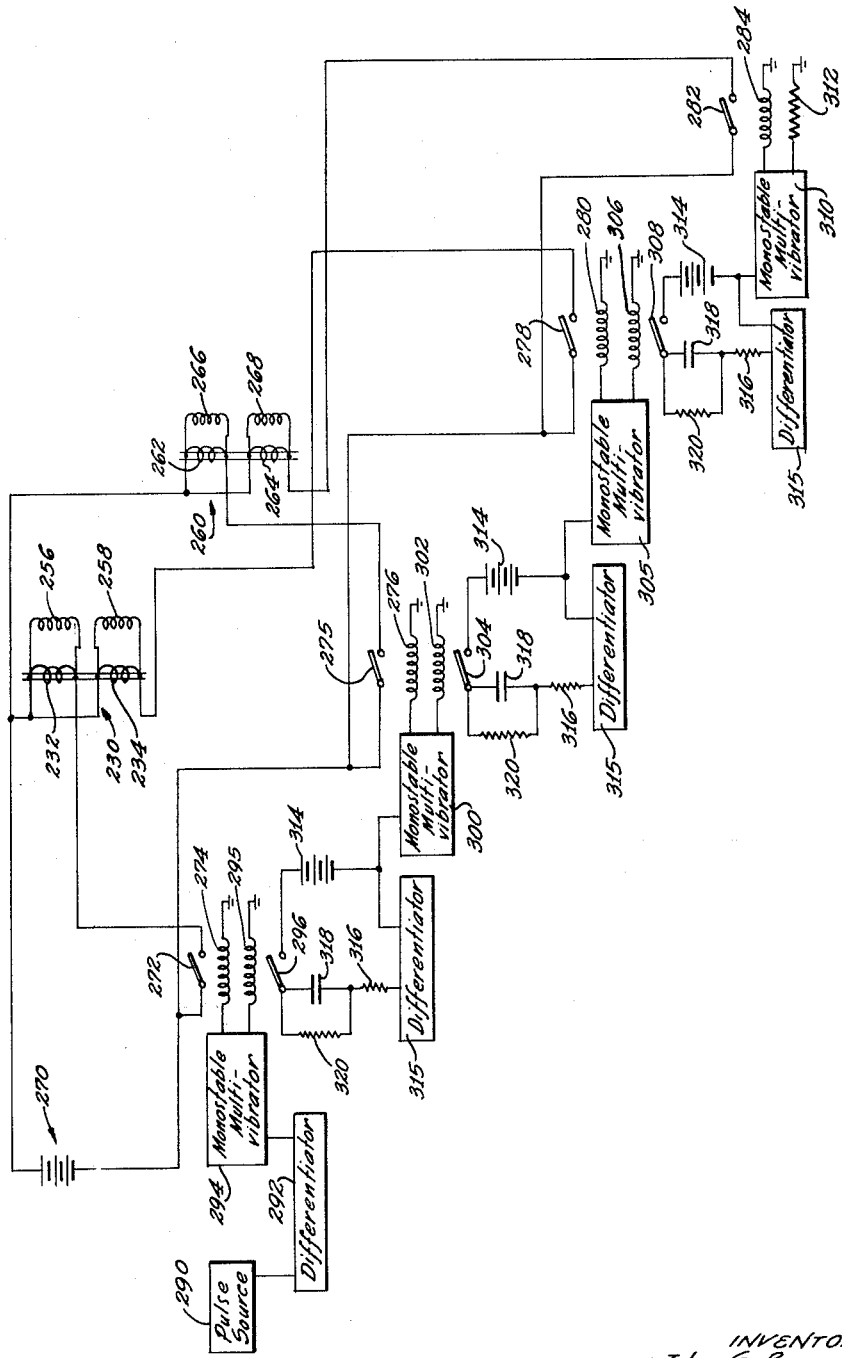

Nov. 17, 1964  J. S. BARNETT  3,157,882
PULSE OPERATED CAMERA
Filed April 14, 1958  8 Sheets-Sheet 8
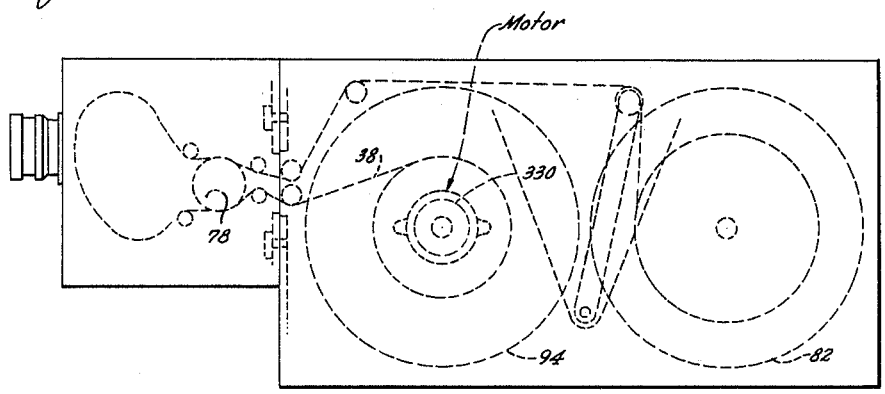
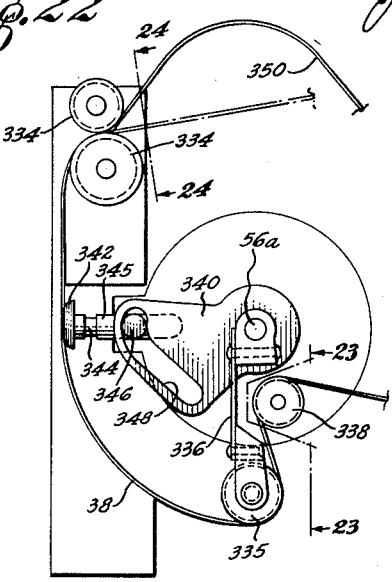
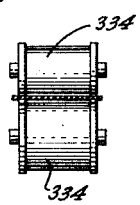
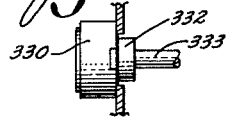
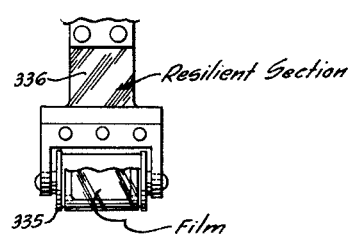
INVENTOR:
John S. Barnett
Attorneys United States Patent Office 3,157,882
Patented Nov. 17, 1964

3,157,882
PULSE OPERATED CAMERA
John Sterling Barnett, Sepulveda, Calif., assignor, by
  mesne assignments, to Data Recording Systems, Inc.,
  Newbury Park, Calif., a corporation of Delaware
    Filed Apr. 14, 1958, Ser. No. 728,372
        32 Claims. (Cl. 352—131)

This invention relates to a pulse operated mechanism for advancing strip material such as punched tape or magnetic recording tape or photographic film and has special utility for use in a camera or a projector. The invention is directed to the solution of certain problems that arise in the use of such a mechanism for various purposes.

One of the problems is to provide an intermittently operable film feeding or advancing mechanism that functions with minimum inertia whereby the mechanism may be abruptly accelerated or decelerated for prompt initiation and completion of an operating cycle. Another problem is to provide power means for operation of the film advancing mechanism with high speed and minimum time delay. A third problem is to provide a suitable arrangement for feeding film to such a mechanism from a relatively large reel of film in such a manner as to permit successive operations of the film shifting mechanism with minimum time delay between operations. The solution of these three problems results in a high speed camera mechanism having an exceedingly short operating cycle that may be repeated any number of times in rapid succession.

Broadly described, the invention meets these problems by employing a compact concentric rotary mechanism of low mass to advance a loop of film intermittently; by employing a plurality of solenoids to actuate different parts of the concentric mechanism in sequence to carry out a complete operating cycle; and by further feeding increments of film from the relatively massive supply reel to the loop of film and simultaneously winding up increments from the loop of film with each winding operation extending over a substantial portion, if not a major portion of the operating cycle.

Only two solenoids are needed to carry out the whole operating cycle. The operating cycle is divided into four stages, namely, a first stage in which one of the two solenoids is operated in one of its two respects; a second stage in which the other of the two solenoids is operated in one of its respects, a third stage in which the first solenoid is operated in its opposite respect, and a fourth stage in which the second solenoid is operated in its opposite respect. Each of the armatures of the two solenoids may be electromagnetically operated in one of its respects and spring-operated in its opposite respect in a conventional manner.

In the preferred practice of the invention, the two rotary solenoids not only carry out the four-stage operating cycle for shifting the film loop in the region of the lens aperture but also carry out a concurrent operation of feeding an increment of film from a supply reel as well as a concurrent operation of winding up an increment from the film loop. In this regard, a feature of the invention is the concept of employing a solenoid that operates during only one stage of the operating cycle but stores up energy in that stage for winding and unwinding operations, the performance of which extends into other stages of the operating cycle.

In the preferred practice of the invention, the energy for unwinding film from a supply reel is stored in one spring means and energy for winding up the film on a second reel is stored in a second spring means. The means for storing energy to rotate the take-up reel may comprise a longitudinally resilient belt and a drive sheave engaging the belt. When the drive sheave is periodically rotated, it places the longitudinally resilient belt under tension and the tension is subsequently relieved by rotation of the take-up reel.

The camera mechanism of the invention is versatile in the sense that it may be caused to operate through its whole cycle automatically by one pulse of electric current or it may be operated by two pulses of electric current delivered to the two solenoids respectively in sequence with the period of exposure of the film during the operating cycle determined by the time interval between the initiation of the first pulse and the initiation of the second pulse.

If solenoid springs are used for return movements of the camera mechanism as in the above described four stage operating cycle, the cycle may be affected by inertia in those instances where the camera is subject to high G acceleration forces. In this regard, a feature of a further practice of the invention is the employment of two-coil solenoids instead of solenoids of conventional construction. The four solenoid coils of the two solenoids are energized for the four stages, respectively, of the operating cycle of the film shifting mechanism, the electromagnetic power applied at each stage being sufficient to overcome inertia effects. One advantage of such an arrangement is that each of the four solenoids may be relatively light since it is not required to store a substantial amount of energy in an associated spring for carrying out a subsequent stage of the cycle.

A further feature of the invention is that it may be modified to handle a plain strip of ribbon-like material that does not have sprocket holes. In this modification of the invention, a pressure plate or clamping means instead of pilot pin means is used to immobilize the strip intermittently and an oscillating loop-forming means is used to advance the film during alternate time periods.

A further feature of the invention in its use for a camera mechanism is that the time period of exposure of the film may be outside the time period of the cycle of operation of the means for shifting the film. Thus the exposure of the film occurs when the whole camera mechanism is stationary with minimum possibility of vibration. In one such practice of the invention, the camera is used in darkness with the lens open and a strobe flash occurs immediately before the film shifting cycle is initiated. In another practice of the invention a shutter mechanism is operated through an exposure cycle and the film shifting mechanism is operated automatically in response to completion of the exposure cycle.

The various features and advantages of the invention may be understood from the following description considered with the accompanying drawings.

In the drawings, which are to be regarded as merely illustrative:

FIGURE 1 is a side elevation of a pulse camera embodying one practice of the invention, cover plates being removed to expose the mechanism and portions being broken away to reveal concealed structure;

FIG. 1a is a top sectional view taken along the line 1a—1a of FIG. 1;

FIGURE 2 is a side elevation showing how an intermittently operated drive sheave is connected to a film reel by a longitudinally resilient belt to tension the belt intermittently thereby to store energy in the belt for rotation of the reel;

FIGURE 10 is a chart of the four stage operating cycle;

FIGURE 11 is a side elevation showing the ratchet mechanism for advancing the film together with the two rotary solenoids. The view also shows a switch that controls one of the solenoids in response to the operation of the other solenoid;

FIGURE 11a is a side elevational view showing how a drive pawl cooperates with the ratchet mechanism;

FIGURE 11b is a side elevation of an escapement wheel and a pair of cooperating pallets that are used in the ratchet mechanism;

FIGURE 16 is a fragmentary wiring diagram showing how a strobe flash unit may be placed in parallel with one of the two rotary solenoids to expose the film immediately before the four-stage cycle;

FIGURE 17 is a fragmentary diagram showing how a solenoid means for operating a self-winding shutter of a camera may be used to make an exposure and then initiate the four stage cycle;

FIGURE 18 is a longitudinal sectional view of a two-coil solenoid in which two coils act in opposite respects on a common armature;

FIGURE 19 is a wiring diagram of a control system incorporating a pair of two-coil solenoids to carry out the four stage cycle;

FIGURE 20 is a simplified side elevational view of a modified camera incorporating the principles of the invention;

FIGURE 21 is a fragmentary side elevational view showing how the motor in FIGURE 20 is connected to a film reel by a friction clutch;

FIGURE 22 is a simplified side elevational view showing how the principles of the invention may be applied for intermittently shifting a strip of ribbon-like material that does not have sprocket holes therein;

FIGURE 23 is a sectional view taken as indicated by the line 23—23 in FIGURE 22 showing the construction of a spring arm that repeatedly forms loops in the film and thereby intermittently periodically advances the film; and FIGURE 24 is a side elevational view of a pair of frictionally retarded rollers as seen along the line 24—24 in FIGURE 22.

Figure 3:
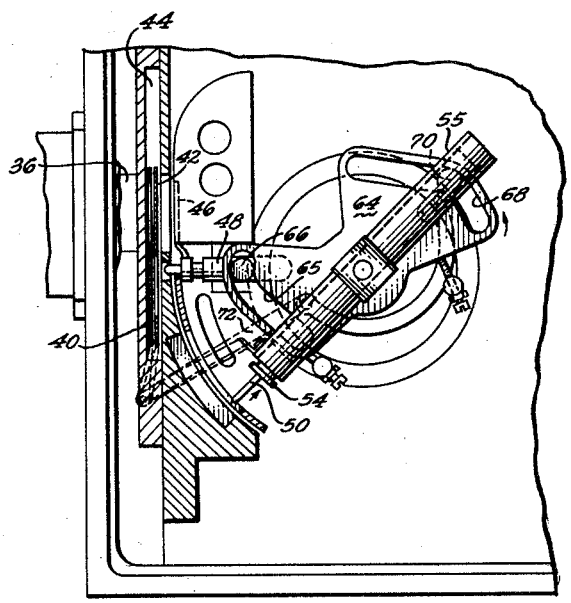
FIGURE 3 is a view of the film shifting mechanism of the camera on an enlarged scale, the view being partly in side elevation and partly in section and the parts being shown as positioned at the start of the four-stage operating cycle.

*General Arrangement of the First Embodiment, FIGURES 1 to 15*

The moving parts of the first embodiment of the invention are mounted in a camera housing 30 and in an associated magazine housing 32 that is releasably attached thereto by thumb screws 34. The two housings have side cover plates that are removed in FIGURE 1. The camera housing 30 is provided with the usual lens barrel 35 which opens into a camera chamber 36 (FIGURE 3) in which the film is exposed. The film, which is generally designated by letter F, is formed into a loop 38 to permit the film to be shifted intermittently along a path through the operating zone or exposure zone provided by the chamber 36.

The principal parts of this first embodiment of the camera include the following: a pair of shutter blades 40 and 42 (FIGURES 8 and 9) which reciprocate across the camera chamber 36 in a guide way 44 (FIGURE 3); a pair of pilot pins 45 (FIGURES 4 and 5) to anchor the film intermittently against longitudinal movement; a pressure plate 46 that intermittently presses the film against cooperating surfaces to immobilize the portion of the film that extends across the camera chamber; a longitudinally reciprocative carrier 48 on which the pilot pins 45 and the pressure plate 46 are mounted for intermittent engagement with the film; a pair of claws 50 (FIGURE 7) for periodically shifting the film loop 38 along its path through the exposure zone in chamber 36; a shank member 52 on which the pair of claws 50 is mounted by a bracket 54; a rocker sleeve 55 in which the shank member 52 is slidably mounted for extension and retraction of the pair of claws 50 and for swinging movement of the claws to advance the film intermittently; a rocker shaft 56 carrying the rocker sleeve 55; a first rotary solenoid 58 operatively connected to the rocker shaft 56 for oscillation thereof; an angular arm 60 (FIGURES 3 and 7) and an associated link 72 that operatively connect the rocker sleeve 55 to the shutter blade 42 for reciprocation thereof; a rotary cam 64 (FIGURES 3 to 6) to reciprocate the carrier 48 longitudinally and to reciprocate the shank member 52 longitudinally, the rotary cam having a cam slot 65 to engage a follower lug 66 of the carrier 48 and having a second cam slot 68 to engage a follower lug 70 (FIGURES 3 and 7) of the shank member 52; an angular arm 72 (FIGURES 3 and 7) and an associated link 74 that operatively connect the rotary cam 64 with the shutter blade 40 for reciprocation of the shutter across the camera chamber 36; a tubular shaft 75 that carries the rotary cam 64 for oscillation of the cam; a second rotary solenoid 76 that is operatively connected to the tubular shaft 75 for oscillation thereof; a rotary means in the form of a sprocket drum 78 (FIGURE 1) to engage spaced portions of the film F to feed increments of the film to the upper end of the film loop 38 and simultaneously to withdraw corresponding increments of the film from the lower end of the film loop; four guide members 80 adjacent the periphery of the sprocket drum 78 to hold the two portions of film in engagement with the sprocket drum; a rotatably mounted supply reel 82 in the magazine housing 32 for the unexposed film; two guide rollers 84 and 85 on fixed spindles for guiding the film from the supply reel 82 to the sprocket drum 78; an arm 86 mounted on a pivot 88 and carrying a roller 90 in contact with the film to off-set the film between the supply reel 82 and the guide roller 84 thereby to form a loop or off-set in the film, the arm being biased by a spring 92 to move in its loop-forming direction; a take-up reel 94 in the magazine housing 32 to wind up the exposed film from the sprocket drum 78; a guide roller 95 on a fixed spindle to guide the exposed film from the sprocket drum to the take-up reel; a drive sheave 96 (FIGURES 1 and 2)

united with the sprocket drum 78 concentrically thereof for actuation of the take-up reel 94; a longitudinally resilient belt 98 in the form of continuous coil spring that operatively connects the drive sheave 96 with a driven sheave 100 on the side of the take-up reel; a ratchet wheel 102 (FIGURES 11 and 11a) operatively connected with the sprocket drum 78 concentrically thereof for intermittently actuating both the sprocket drum and the drive sheave 96; a drive pawl 104 pivotally mounted on a rocker arm 105 to rotate the ratchet wheel intermittently; an angular link 106 operatively connecting the second rotary solenoid 76 to the rocker arm 105 for actuation of the ratchet wheel; a microswitch 108 (FIGURES 11, 12 and 13) for controlling the energization of the second rotary solenoid 76 in response to operation of the first rotary solenoid 58; and lost-motion connecting means including a snap-action arm 110 and an operating arm 112 connected to the first rotary solenoid 58 by a link 114 for operating the microswitch 108. The basic combination in the above described mechanism is disclosed in my pending application S.N. 483,556, filed January 24, 1956, now Patent No. 2,909,096, issued October 20, 1959.

*Mode of Operation of the First Embodiment of the Invention*

The operating cycle of the camera mechanism may be divided into four stages as indicated in FIGURE 10. At the beginning of this operating cycle, the rocker sleeve 55 and the rotary cam 64 are in the position shown in FIGURE 3. The pair of claws 50 is retracted; the pilot pins 45 and the pressure plate 46 are extended to immobilize the film; and the two shutters 40 and 42 are in their normal lower positions at which they cut off light from the exposure chamber 36.

Figure 4:
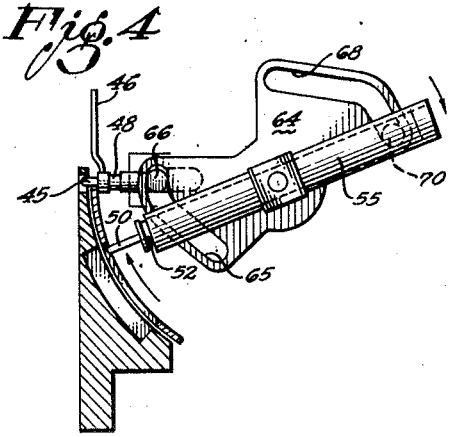
FIGURES 4, 5 and 6 are similar views showing the positions of the parts of the mechanism at successive stages of the operating cycle.
Figure 5:
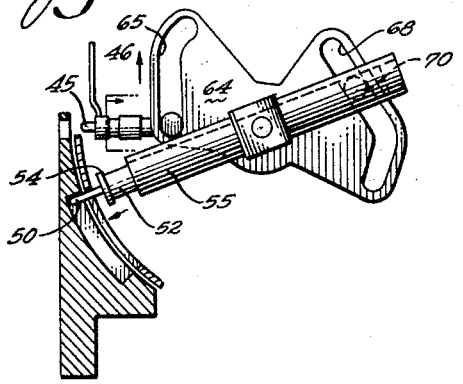

With the two rotary solenoids 58 and 76 de-energized, energization of the first rotary solenoid 58 causes the rocker sleeve 55 to swing from the position shown in FIGURE 3 to the position shown in FIGURE 4 with consequent swinging movement of the retracted claws 50 adjacent the stationary film and with consequent movement of the shutter blade 42 to its upper position at which the aperture 115 therein (FIGURE 9) registers with the aperture 116 in the shutter blade 40 to permit light to enter the camera chamber 36 to expose the portion of film therein.

When the first rotary solenoid 58 reaches a point in its operation at which these actions are completed, it closes the normally open microswitch 108 to energize the second rotary solenoid 76 to carry out the second stage of the operating cycle, the first rotary solenoid remaining energized through this second stage. In this second stage, rotation of the rotary cam 64 from the position shown in FIGURE 4 to the position showing in FIGURE 5 results in extension of the pair of claws 50 into engagement with the film by virtue of the action of the cam slot 68 on the follower 70 and further results in retraction of the pilot pins 45 and the pressure plate 46 by the action of the cam slot 65 on the follower 66. At the same time, the rotation of the rotary cam 64 raises the shutter blade 40 to position the blank portion thereof across the aperture 115 of the shutter blade 42 to cut off the light from the camera chamber 36 to terminate the film exposure period.

During this second stage of the operating cycle, the rocker arm 105 carrying the drive pawl 104 is actuated by the second solenoid 76 to rotate the ratchet wheel 102 together with the sprocket drum 78 and drive sheave 96 that are united therewith. The sprocket drum 78 feeds a new increment of film with consequent leftward swing of the spring-pressed arm 86 thereby storing energy for the arm to return, the return movement of the arm drawing another increment of film from the supply reel 82. The sprocket drum 78 also and simultaneously releases an increment of film to be wound on the take-up reel 82. The drive sheave 96 acts on the longitudinally resilient belt 98 to rotate the take-up reel 94 to wind up the released increment of the exposed film. The inertia of the take-up reel, however, prevents immediate response, and therefore, the driving portion of the resilient belt is stressed in tension to store energy for delayed rotation of the take-up reel during the remaining stages of the operating cycle. The amount of rotation by the drive sheave 96 is sufficient to cause the reel to wind the exposed film when only a few turns of the exposed film are on the reel and, therefore, the amount of rotation by the drive sheave is more than enough when more turns are wound up. Consequently, after a few turns are wound on to the take-up reel, the belt 98 may be maintained under constant tension to exert constant winding force on the reel, the drive sheave 96 slipping relative to the belt whenever the tension tends to become excessive.

The third stage of the operating cycle is carried by de-energizing the first rotary solenoid 58 and keeping the second rotary solenoid 76 energized. De-energization of the first solenoid causes the return movement of the solenoid by the usual solenoid spring incorporated therein, and this return movement causes counter-clockwise rotation of the rocker sleeve 55 from the position shown in FIGURE 5 to the position shown in FIGURE 6. Since the pair of claws 50 are in engagement with the film and the pilot pins 45 and the pressure plate 46 are retracted, the film is shifted by a sufficient increment to bring a new portion of unexposed film into the exposure chamber 36. This return film-shifting swing of the rocker sleeve 55 lowers the shutter blade 42 to its starting position without admitting light into the exposure chamber, since the two apertures 115 and 116 of the two shutter blades remain out of register with each other.

Figure 6:
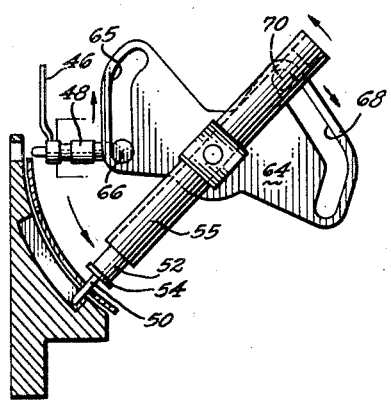
Figure 7:
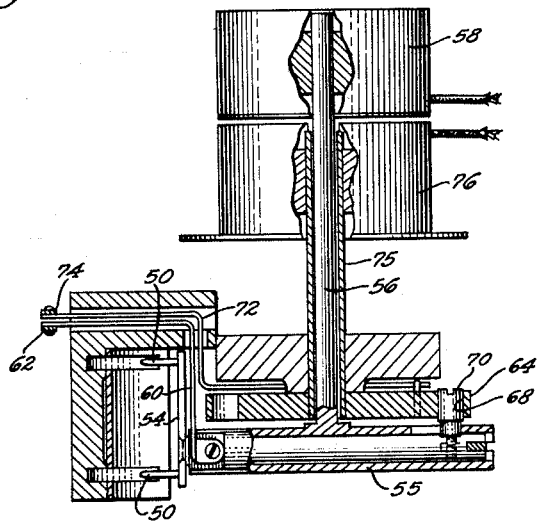
FIGURE 7 is a view largely in section and partly in plan showing the film-shifting mechanism together with two coaxial rotary solenoids for actuating the mechanism.
Figures 8, 9:
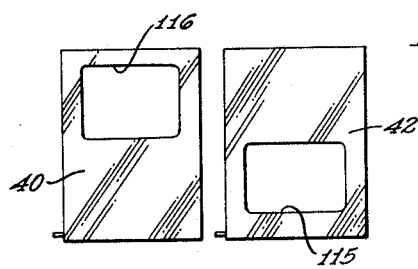
FIGURES 8 and 9 are face views of a pair of cooperating shutter blades that are employed for controlling the exposure of the film in one practice of the invention.

The fourth stage of the operating cycle is carried out by de-energization of the second rotary solenoid 76, the spring actuated return movement of the solenoid causing the rotary cam 64 to oscillate counter-clockwise from the position shown in FIGURE 6 to the starting position shown in FIGURE 3. This oscillation of the rotary cam 64 extends the pilot pins 45 together with the pressure plate 46 to immobilize the film and at the same time retracts the shank member 52 to withdraw the pair of claws 50 from engagement with the film. This return oscillation of the rotary cam 64 also lowers the shutter blade 40 to its starting position without admitting light into the exposure chamber, since the two apertures of the two shutter blades remain out of register with each other as may be seen in FIGURES 8 and 9.

Figure 14:
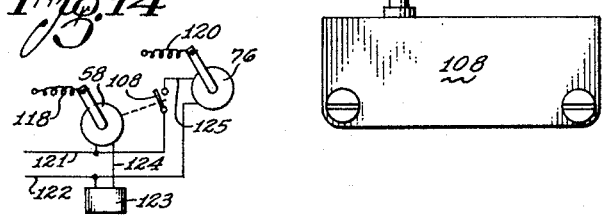
FIGURE 14 is a wiring diagram of a circuit that may be used to control the camera.

FIGURE 14 is a wiring diagram of a control circuit that may be used for this first embodiment of the invention. The first rotary solenoid 58 is shown diagrammatically as equipped with a return spring 118, and the second rotary solenoid 76 in like manner is shown with a return spring 120. A lead 121 from a suitable E.M.F. source is connected to one side of the first solenoid 58 and to one side of the microswitch 108. A second lead 122 from the E.M.F. source is connected to one side of a pulse switch 123 and to one side of the second rotary solenoid 76. The second side of the pulse switch 123 is connected to the second side of the rotary solenoid 58 by a wire 124 and the second side of the rotary solenoid 76 is connected to the second side of the microswitch 108 by a wire 125.

To cause a cycle of operation of the camera, the pulse switch 123 closes to produce a pulse of current to energize the first solenoid 58 long enough to carry through the first two stages of the operating cycle. During the first stage, the solenoid 58 operates in one respect or direction against the opposition of the spring 118 and closes the switch 108 to initiate the second stage. The second rotary solenoid 76 operates through the second stage against the opposition of its spring 120 and then termination of the control pulse causes de-energization of the first solenoid 58 for return movement by its spring to carry out the third stage. At the end of the third stage, the opening of the microswitch 108 by the first solenoid de-energizes the second rotary solenoid to carry out the fourth stage.

Figure 15:
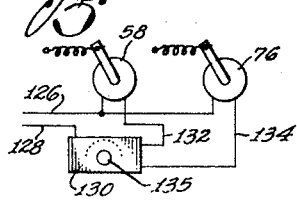
FIGURE 15 is a similar view of an alternate control circuit.

An alternate circuit arrangement is shown in the wiring diagram in FIGURE 15 in which one lead 126 from an E.M.F. source is connected to one side of each of the two rotary solenoids 58 and 76. The second lead 128 from the source is connected to a control unit 130 which incorporates 2 pulse switches (not shown) for energizing the two rotary solenoids respectively. For this purpose, a wire 132 connects the control unit 130 to one side of the first solenoid 58, and a second wire 134 connects the control unit to the second side of the second rotary solenoid 76.

The two pulse switches that are incorporated in the control unit 130 produce two overlapping pulses in sequence which are represented in FIGURE 10 as the overlapping time periods in which the two solenoids are energized. It is apparent that these overlapping pulses delivered to the two solenoids respectively will carry out the desired operating cycle.

One advantage of this second circuit arrangement is that since the time period in which the film is exposed is determined by the lag in the initial energization of the second solenoid behind the initial energization of the first solenoid, the timing of the two pulses may be varied to vary the exposure time. For this purpose, the control unit 130 may have an adjustable knob 135 which may be set for different time exposure intervals.

*Structural Details of the Ratchet Mechanism, FIGURES 11 to 11b*

The ratchet wheel 102 is keyed to a shaft 140 on which the drive sheave 96 is fixedly mounted and on which the rocker arm 105 that carries the drive pawl 104 is rotatably mounted. A suitable spring 142 yieldingly urges the drive pawl 104 into engagement with the teeth 144 of the ratchet wheel 102. The angular link 106 that is actuated by the second rotary solenoid 76 is connected to the rocker arm 105 by a pivot means 145 so that clockwise movement of the rocker arm caused by energization of the second rotary solenoid results in the drive pawl 104 engaging a tooth 144 to cause a clockwise advance of the ratchet wheel 102.

When the second rotary solenoid 76 is de-energized for spring-actuated return movement, the link 106 swings the rocker arm 105 back to its normal position with the drive pawl dragging over the teeth 144. To prevent the friction of the returning drive pawl from rotating the ratchet wheel 102 backwards, a second pawl 146 is mounted on a fixed pivot stud 148 to engage the ratchet teeth 144, the second pawl being yieldingly urged into engagement with the teeth by a suitable spring (not shown).

Interposed between the ratchet wheel 102 and the drive sheave 96 is an escapement wheel 154 which is best shown in FIGURE 11b, the three members being united by a pair of pins 155. The teeth 156 of the escapement wheel 154 are turned in the opposite direction from the teeth 144 of the ratchet wheel 102. Adjacent the periphery of the escapement wheel 154 are a pair of pallets in the form of a hook member 158 and a small finger 160. These two pallets are united with each other and are mounted to swing about a fixed pivot 165. A wire spring 166 mounted on the pivot 165 continuously urges this pallet assembly in a counter-clockwise direction as viewed in FIGURE 11.

For oscillation of the pair of pallets, the rocker arm 105 has an extension 168 (FIGURES 11 and 11a) which carries a pin 170 for movement against the back of the hook member 158. Reciprocation of the angular link 106 by the second rotary solenoid 76 causes the pin 170 to move between the limit position shown in solid lines in FIGURE 11b and the alternate limit position shown in dotted lines, the movement being along an arc concentric to the axis of the escapement wheel. This movement of the pin 170 cams the pallet assembly about the axis of the pivot 65 in such manner that whenever one of the two pallets 158 and 160 moves out of the range of the escapement wheel teeth 156, the other pallet moves into the range of the teeth. Since the two pallets may be rocked freely against the resistance of the spring 166, and since the escapement wheel teeth 156 point oppositely to the direction of rotation, there is no interference with the normal forward motion of the escapement wheel. The two pallets cooperate with the escapement wheel, however, to block any tendency for the escapement wheel to rotate forward beyond the stroke of the drive pawl 104.

Figure 12:
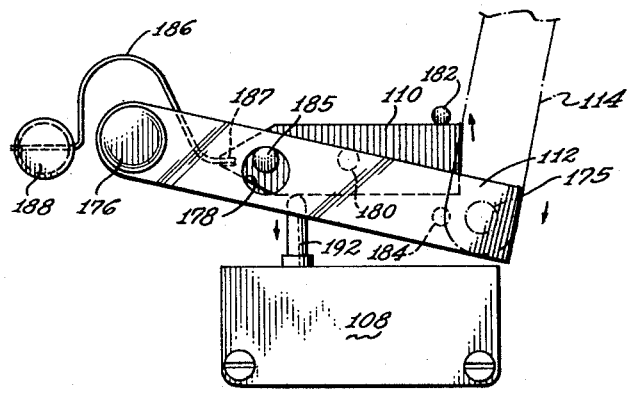
FIGURE 12 is an enlarged detail of FIGURE 11 showing a lost-motion means for operatively connecting one of the solenoids to the associated switch.
Figure 13:
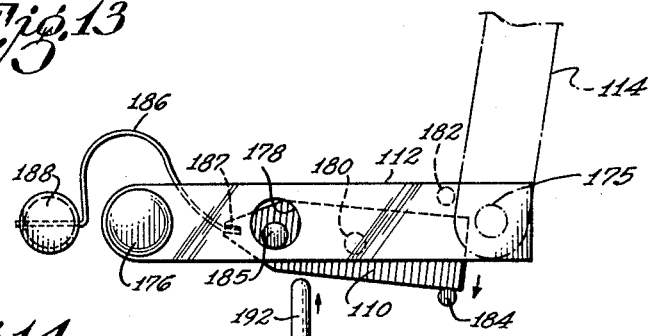
FIGURE 13 is a similar view showing the lost-motion means at another position.

*Structural Details of Switch Mechanism, FIGURES 11, 12 and 13*

The previously mentioned operating arm 112 for controlling the microswitch 108 is connected by a pivot 175 to the previously mentioned link 114 that is actuated by the first solenoid 58. The operating arm 112 is mounted on a pivot 176 and is provided with a circular aperture 178. The previously mentioned snap-action lever 110 is fulcrumed on a fixed pivot 180 to swing in an arc between two stop pins 182 and 184. The snap-action lever 110 is controlled by the operating arm 112 and for this purpose is provided with a lug 185 that extends into the aperture 178. A suitable bowed leaf spring 186 is connected at one end 187 thereof to the snap-action lever 110, the opposite end of the leaf spring being mounted on a fixed stud 188.

The arrangement is such that oscillation of the operating arm 112 by the first rotary solenoid 58 causes the lug 185 to be engaged repeatedly by the opposite edges of the aperture 178 to force the lever 110 repeatedly to a past center position with respect to alignment of the end of the bowed leaf spring 186 with the pivot 180 and the fixed stud 188. The fact that the diameter of the aperture 178 is large relative to the diameter of the stud 185 provides the lost motion which permits the first solenoid to complete the first stage of the operating cycle before the microswitch 108 is operated.

The microswitch 108 takes a closed position when unrestrained and takes an open position when its operating plunger 192 is depressed. FIGURES 11 and 12 show the normal position of the operating arm 112 with the first rotary solenoid 58 de-energized, the operating arm 112 being swung to its lower limit position. At this time, the snap-action lever 110 is swung downward past center with the bowed leaf spring 186 tending to rock the snap-action lever counter clockwise and with this tendency blocked by the stop pin 182.

When the first rotary solenoid 58 is energized, the initial upward movement of the operating arm 112 is not communicated to the snap-action lever 110, but after completion of the first stage of the operating cycle the second side of the aperture 128 moves against the lug 185 to shift the snap-action lever 110 past center whereupon the lever snaps to its second position against the stop pin 184. This snap-action carries the lug 185 away from the rim of the aperture 178 but the final upward movement of the operating arm 112 again moves the rim of the aperture close to the lug. The final positions of the parts when the first rotary solenoid is energized are shown in FIGURE 13.

It is apparent that when the first solenoid 58 is subsequently de-energized for return downward movement of the operating arm 112 from the position shown in FIG. 13, there is an initial time delay in which the aperture 178 moves relative to the lug 185, this time delay being sufficient for completion of the third stage of the operating cycle. When the aperture 178 of the operating arm 112 moves sufficiently to force the lug 185 past center, the lever 110 snaps back to its normal position at which time it presses the operating plunger 182 to open the microswitch 108. The operating arm 112 then continues downward to its final normal position shown in FIGURE 12 at which time the upper edge of the aperture 178 is near the lug 185.

Modifications of the Invention for Camera Exposure Outside of the Operating Cycle of the Camera Mechanism In some instances, it may be desirable to expose the film immediately before or immediately after the above described operating cycle. Such an arrangement has the advantage of the film being exposed when none of the parts of the mechanism are moving so that any tendency for the film to vibrate is minimized.

If the camera is used in darkness with the lens aperture continuously open for a series of exposures, a strobe flash device may be wired in parallel with the first rotary solenoid to illuminate a scene for an exposure before the first rotary solenoid has time to respond to the closing of the circuit. FIGURE 16 shows how a strobe flash device 195 may be wired in parallel with a first rotary solenoid 58a, one side of the solenoid and one side of the strobe flash device 195 being connected to the previously mentioned wire 121 in FIGURE 14 and the other side of each being connected to the wire 124.

FIGURE 17 shows an arrangement that may be employed for the same purpose in daylight. The previously described shutter blades 40 and 42 are omitted and, instead, the lens barrel 35 is provided with a self-winding shutter mechanism 200 that is shown diagrammatically in FIGURE 17. A solenoid represented by a coil 202 has an armature 204 that is normally retracted by the usual solenoid spring (not shown). The stroke of the armature 204 is sufficient to cause a complete exposure cycle of the shutter mechanism 200, and at the end of the stroke the armature moves against the operating plunger 205 of a microswitch 206 to close the microswitch.

One lead 208 of the energizing circuit shown in FIGURE 17 is connected to one side of a first rotary solenoid 58b one side of the solenoid coil 202 and one side of a delayed-action switch 108a which is identical with the previously described switch 108. The other lead 210 of the energizing circuit is connected to one side of a pulse switch 123a which is identical with the previously described pulse switch 123. The lead 210 is also connected to one side of the microswitch 206 and one side of the second rotary solenoid 76a which is identical with the previously described rotary solenoid 76. The second side of the pulse switch 123a is connected by a wire 212 with the second side of the solenoid coil 202. The second side of the microswitch 206 is connected by a wire 215 to the second side of the first rotary solenoid 58b, and a wire 216 connects the second side of the delayed-action switch 108a to the second side of the second rotary solenoid 76a.

When the pulse switch 123a closes for a time interval sufficient for operation of the shutter mechanism 200 and additionally sufficient for the camera mechanism to operate through its first two stages, initially the solenoid coil 202 is energized and at the end of the exposure cycle of the shutter mechanism 200 the solenoid armature 204 depresses the operating plunger 205 to close the microswitch 206 for energization of the first rotary solenoid 58b to carry out the first stage of the operating cycle. The energization of the rotary solenoid 58b closes the switch 108a after a time delay for energization of the second solenoid 76a to carry out the second stage of the operating cycle. The end of the pulse of current from the pulse switch 123a at the end of the second stage of the operating cycle de-energizes the first rotary solenoid 58b for the third stage, and after a time interval the switch 108a is opened by the first rotary solenoid to de-energize the second rotary solenoid 76a to carry out the fourth stage of the operating cycle.

The Embodiment Shown in FIGURES 18 and 19

The forms of the invention described to this point have incorporated solenoids of conventional construction in which one stroke of the solenoid armature is accomplished magnetically and the opposite or return stroke is actuated by spring means. In some installations, the use of springs for the return movements of the solenoid armatures is objectionable because inertia forces may affect the spring actuated movements. For example, acceleration or de-acceleration of a vehicle or missile may interfere with the spring actuated return movement and thus cause malfunctioning of the camera. A further disadvantage in the use of a conventional solenoid is that the power stroke must be carried out with relatively great force to store enough energy in the spring for the subsequent return movement. Thus, electric current is consumed at a higher rate than would be necessary if the return movement of the solenoid armature were also actuated magnetically.

FIGURE 18 shows by way of example the construction of a solenoid 230 with the two coils, which solenoid may be substituted for each of the previously described rotary solenoids. The solenoid 230 has two opposite coils 232 and 234 which act on a common armature 235, the armature being movable between two adjustable stop screws 236. The armature 235 is of non-circular configuration and is slidingly mounted in a non-circular guideway 238 which keeps the armature from rotating on its axis. The armature 235 is united with and carries a cam sleeve 240 having an inclined cam slot 242. A rotary shaft 244 journalled in suitable bearings 245 is controlled by the cam sleeve 240, and for this purpose is provided with a radial follower that extends into the cam slot 242. In the construction shown, the cam follower comprises a small ball bearing 246 on a radial stud 248.

The armature 235 has two opposite limit positions and is automatically latched in one of these alternate positions whenever both coils 232 and 234 are de-energized. A latch for this purpose may comprise a retractable latch pin 250 which is acted on by a suitable spring 252 to cooperate with two latch recesses 254 and 255 in the armature. The latch pin 250 is controlled by two auxiliary solenoid coils 256 and 258. The auxiliary solenoid coil 256 is in parallel with the solenoid coil 232 to release the latch pin 250 whenever the solenoid coil 232 is energized, and in like manner the auxiliary solenoid coil 258 is in parallel with the solenoid coil 234 to be energized simultaneously therewith.

The normal position of the armature 235 is shown in FIGURE 18 with the follower roller 246 at one end of the cam slot 242 and with the latch pin 250 engaging the latch recess 254. When the solenoid coil 232 is energized and the auxiliary solenoid coil 256 is simultaneously energized, the armature 235 is attracted upward. This upward movement causes the shaft 244 to rotate in one direction by cam action and subsequent de-energization of the coil 256 results in the armature being latched at its upper position. Later, energization of the lower solenoid coil 234 with simultaneous energization of the auxiliary solenoid coil 258 returns the armature 235 downward to its starting position with consequent return rotation of the shaft 244.

FIGURE 19 is a wiring diagram showing by way of example an electrical system that may be employed to carry out the operating cycle of a camera by means of two solenoids with two coils substituted for the conventional solenoids heretofore described. One of the two coil solenoids in FIGURE 18 is the solenoid generally designated 230 which has just been described. This solenoid 230 has the two solenoid coils 232 and 234 together with the corresponding auxiliary solenoid coils 256 and 258. The other two-coil solenoid is generally designated 260 in FIGURE 19, and has two solenoid coils 262 and 264 together with two corresponding auxiliary solenoid coils 266 and 268.

The solenoids are energized by a suitable E.M.F. source such as a battery 270. The first solenoid coil 232 of the first solenoid 230 and the corresponding auxiliary solenoid coil 256 are controlled by a normally open switch 272 that may be magnetically closed by a relay coil 274; the first solenoid coil 262 of the second solenoid 260 and the corresponding auxiliary solenoid coil 266 are controlled by a normally open switch 275 that may be magnetically closed by a relay coil 276; the second solenoid coil 234 of the first solenoid 230 and the corresponding auxiliary solenoid coil 258 are controlled by a third normally open switch 278 and a corresponding relay coil 280; and the second solenoid coil 264 of the second solenoid 260 together with the corresponding auxiliary solenoid coil 268 is controlled by a normally open switch 282 and a corresponding relay coil 284. The four normally open switches 272, 275, 278 and 282 may be closed momentarily in sequence to carry out the four stages of the previously described operating cycle, it will be apparent to those skilled in the art that various arrangements may be employed to operate the four switches in the desired sequential manner.

In the arrangement shown in FIGURE 19 for carrying out the required cycle, signals from a pulse source 290 are fed to a differentiator 292 which may be constructed in a manner similar to that disclosed on pages 2–27 to 2–38 of "Principles of Radiation" (second edition), published by the staff of Massachusetts Institute of Technology. The signals from the differentiator 292 are fed to a monostable multivibrator 294 which may be constructed in a manner similar to that disclosed on pages 2–44 to 2–46, inclusive, of "Principles of Radiation."

The monostable multivibrator 294 has two output terminals, one of which is connected to the previously mentioned relay coil 274, and the other of which is connected to a relay coil 295 to control a normally open switch 296. In its normal state, the multivibrator 294 produces a relatively high voltage in the relay coil 295 to close the associated switch 296, but produces only a low voltage in the relay coil 274 that is insufficient to close the associated switch 272. In like manner, a monostable multivibrator 300 has two output terminals, one of which is connected to the relay coil 276 that controls the switch 275, the other terminal being connected to the relay coil 302 that controls a normally open switch 304. In its normal state, the multivibrator 300 provides low voltage in the relay coil 276 insufficient to close the switch 275 and provides high voltage in the relay coil 302 to close the associated switch 304.

A third monostable multivibrator 305 has one output terminal connected to the relay coil 280 for controlling the switch 278, and has a second output terminal connected to a relay coil 306 for controlling a normally open switch 308. The relay coil 280 is normally at insufficient voltage to close the switch 278, but the relay coil 306 is normally energized at relatively high voltage to close the switch 308. Finally, a fourth monostable multivibrator 310 has one output terminal connected to the relay coil 284 to close the switch 282, and has a second output terminal that is connected to a resistance 312. Normally, the relay coil 284 is energized with insufficient voltage to close the switch 282, the high voltage being imposed on the resistor 312.

Each of the three switches 296, 304 and 308 is in a corresponding circuit in which the switch is in series with a suitable power supply such as a battery 314, a differentiator 315, a resistance 316, and a parallel combination formed by a capacitance 318 and a resistance 320.

Each signal from the pulse source 290 acting through the first differentiator 292 triggers the first multivibrator 294 to switch the voltages in the two relay coils 274 and 295, the relay coil 274 being energized with high voltage to close the switch 272 and the voltage being reduced in the relay coil 295 to permit the switch 296 to open. This state of operation of the multivibrator 294 continues for a particular period of time which is determined by the parameters provided for the different capacitances and resistances in the multivibrator. During this period of time, the switch 272 is closed by the relay coil 274 to energize the first solenoid coil 232 and the auxiliary solenoid coil 256 of the first solenoid 230, the duration of the time period being sufficient for the first solenoid to carry out the first stage of the operating cycle shown on FIGURE 10. At the end of this predetermined time period the multivibrator 294 returns to its normal state of operation to switch the high voltage from the relay coil 274 to the relay coil 295 with consequent opening of the switch 272 and closing of the switch 296.

The opening of the switch 272 de-energizes the first coil 230 and the associated auxiliary solenoid coil 256 of the first solenoid 230 with consequent latching of the corresponding solenoid armature. The simultaneous closing of the switch 296 results in the corresponding differentiator 315 feeding a signal to the second monostable multivibrator 300 to cause high voltage to switch from the relay coil 302 to the relay coil 276. The consequent closing of the switch 275 energizes the first coil 262 and the corresponding auxiliary solenoid coil 266 of the second solenoid 260 and the consequent opening of the switch 304 breaks the circuit through the second of the differentiators 315. The multivibrator 300 energizes the relay coil 276 with high voltage long enough to carry out the second stage of the operating cycle, and then the high voltage is switched back to the relay coil 302 to cause the corresponding differentiator 315 to trigger the third multivibrator 305.

The third multivibrator 305 switches the high voltage from the relay coil 306 to the relay coil 280 to close the switch 278 for energizing the second coil 234 of the first solenoid 230 to carry out the third stage of the operating cycle. At the end of the predetermined time period required for the third stage, the multivibrator 305 returns to its normal state to open the switch 278 and to close the switch 308 for triggering the fourth multivibrator 310. The fourth multivibrator switches the high voltage from the resistor 312 to the relay coil 284 to close the switch 282 for energizing the second solenoid coil 264 and the auxiliary coil 268 of the second relay 260 long enough to carry out the fourth stage of the operating cycle. The multivibrator 310 then switches the high voltage from the relay coil 284 back to the resistance 312, and the whole circuit system is thereby returned to its normal starting state. It is apparent that the whole cycle is carried out automatically in response to a single pulse from the source 290 and that the whole cycle of operation may be exceedingly short.

*The Embodiment of the Invention Shown in FIGURES 20 and 21*

The camera shown in FIGURE 20 is largely identical with the camera shown in FIGURE 1 as indicated by the use of corresponding numerals to indicate corresponding parts. In this embodiment, the previously mentioned resilient belt 98 and the corresponding sheaves 96 and 100 are omitted and the take-up reel 94 is actuated by a drive motor 330. As best shown in FIGURE 21, the drive motor 330 is operatively connected to the take-up reel 94 by a friction clutch 332 and a shaft 333.

The motor 330 is continuously energized to tend to actuate the take-up reel 94 frictionally through the friction clutch 332. Most of the time, the friction clutch slips with the take-up reel stationary and with the film under tension between the take-up reel and the sprocket drum 78, the sprocket drum being held stationary by the previously described ratchet mechanism. Whenever the two solenoids are energized to carry out an operating cycle in the previously described manner, the ratchet mechanism operates through a cycle to permit the ratchet drum 78 to release an increment of film to the motor-actuated take-up reel 78. Thus, the ratchet mechanism functions to meter increments of film to the take-up reel.

*The Modification of the Invention Shown in FIGURES 22 and 23*

These two figures show how the film advancing mechanism may be modified to handle a plain strip of film that does not have sprocket holes. The previously described sprocket drum 78 is intermittently actuated by the ratchet mechanism in the previously described manner during the second stage of the operating cycle for the purpose of feeding an increment of film to one end of the previously described film loop 38 and simultaneously to take up the same increment at the other end of the loop. The loop of film is engaged by a pair of frictionally retarded rollers 334 above the lens aperture and below the lens aperture the film passes around a roller 335 on the end of a leaf spring arm 336 and around a guide roller 338 that is pivoted on a fixed axis.

A shaft 56a corresponding to the previously mentioned shaft 56 from the first mentioned solenoid 58 is connected directly to the leaf spring arm 336 for oscillation thereof, and a second shaft corresponding to the previously mentioned shaft 75 connects the second solenoid with a rotary cam member 340.

A pressure plate 342 for periodically immobilizing the film in the region of the lens aperture is carried by a shank 344 that extends into a hollow member 345. The hollow member 345 houses a spring (not shown) to provide the necessary pressure for the pressure plate. The hollow member 345 is longitudinally slideable between an advanced effective position shown in FIGURE 22 and a retracted position, and is provided with a laterally projecting follower 346 that extends into a cam slot 348 of the rotary cam 340.

The operating cycle of the mechanism shown in FIGURE 22 is as follows. When the first solenoid is energized, the shaft 56a is rocked clockwise to swing the leaf spring arm 336 clockwise, the pressure plate 342 remaining in pressure contact with the film. The film may be exposed during this first stage if desired or may be exposed either before or after the four stages of the operating cycle. With the first solenoid still energized, the second solenoid is energized for the second stage of the operating cycle in which the rotary cam 340 is rotated clockwise to retract the pressure plate 342 from the film. At the same time, the previously mentioned sprocket drum 78 advances to feed an increment of film to the upper end of the film loop 38 and to draw an increment of film from the lower end of the film loop. Since the two rollers 334 that grip the film are frictionally retarded, the feeding of an increment of film to the upper end of the film loop 38 causes the film to bulge as indicated by dotted lines at 350. The simultaneous withdrawal of the increment of film from the lower end of the loop 38 takes up the slack that was created by the clockwise swing of the leaf spring arm 336. In the third stage of the operating cycle, the pressure plate 342 is still retracted, and the leaf spring arm 336 is swung counter clockwise to return to its initial position and in doing so takes up the slack in the film and forms a loop around the roller 335 as shown in FIGURE 22. This loop-forming action on the part of the leaf spring arm pulls the film through the frictionally retarded rollers 334 and thus causes the bulge 350 to disappear.

My description in specific detail of the selected embodiments of the invention will suggest to those skilled in the art various changes, substitutions and other departures from my disclosure within the spirit and scope of the appended claims.

I claim:

1. In a device for handling a strip of ribbon-like material and having means to shift the strip intermittently along a path through an operating zone of the device, the combination of: a first reel to supply the strip to said shifting means for movement through said zone; a second reel to take up the strip after the strip passes through the zone; a longitudinally resilient belt to drive said second reel; a drive sheave engaging said belt; and means operating in time relation with said shifting means to rotate said drive sheave intermittently to tension said belt to store energy therein for rotation of said second reel.

2. A combination as set forth in claim 1 which includes: means movable in one direction to form a loop in said strip between said first reel and said shifting means; and spring means to yieldingly urge said loop-forming means in said one direction to form a loop in the strip, whereby the intermittent operation of said shifting means withdraws strip from said loop with consequent storage of energy in said spring means for subsequent restoration of the loop by unwinding strip from said first reel.

3. In a device for handling a strip of ribbon-like material and having means to shift the strip intermittently along a path through an operating zone of the device, the combination of: rotary means for engagement with said strip at two longitudinally spaced points thereof for intermittent rotation to feed the strip to the entrance end of said path and simultaneously to withdraw the strip from the other end of the path; a first reel to supply the strip to said rotary means; a second reel to receive the strip from said rotary means; a longitudinally resilient belt to drive said second reel; a drive sheave engaging said belt; and means to operate said rotary means and said drive sheave intermittently whereby the drive sheave tensions said belt intermittently to store energy therein for rotation of said second reel.

4. In a device for handling a strip of ribbon-like material and for moving the strip along a path through an operating zone in the device, the combination of: means to shift said strip intermittently along a path through said zone; rotary means for engagement with the strip at two longitudinally spaced points thereof to supply the strip to said shifting means and to receive the strip from the shifting means; a first reel to supply the strip to said rotary means; a second reel to receive the strip from the rotary means; a longitudinally resilient belt to drive said second reel; a drive sheave engaging said belt; and means to operate said shifting means together with said rotary means and said drive sheave simultaneously and intermittently.

5. A combination as set forth in claim 4 in which said operating means comprises solenoid means.

6. A combination as set forth in claim 4 which includes ratchet means operatively connected both to said rotary means and said drive means; and which includes solenoid means to operate said shifting means and said ratchet means simultaneously.

7. In a device for moving a strip of ribbon-like material along a path through an operating zone in the device, the combination of: means movable from a retracted position to an extended position to immobilize the strip in the region of said zone; means to shift the strip intermittently along said path; a first rotary means operable through a given arc to extend and retract said immobilizing means; a second rotary means operable through a given arc to operate said shifting means; two solenoid actuators to operate said first and second rotary means alternately to alternately immobilize and shift the strip; rotary engaging means engaging said strip at two longitudinally spaced points thereof to feed the strip to said shifting means and simultaneously receive the strip from the shifting means; and ratchet means operatively connected to one of said actuators for actuation thereby and operatively connected to said rotary engaging means for actuation thereof.

8. In a device for moving a strip of ribbon-like material along a path through an operating zone in the device, the combination of: means movable from a retracted position to an extended position to immobilize the film in the region of said zone; means to shift the strip intermittently along said path; a first rotary means operable through a given arc to extend and retract said immobilizing means; a second rotary means operable through a given arc to operate said shifting means; two actuators to operate said first and second rotary means alternately to alternately immobilize and shift the strip; a first reel to supply the strip to the entrance end of said path; a second reel to receive the strip from the other end of the path; a longitudinally resilient belt to drive said second reel; and a drive sheave engaging said belt, one of said two actuators being operatively connected to said drive sheave for intermittent rotation thereof to tension said belt thereby to store energy in the belt for rotation of said second reel.

9. A combination as set forth in claim 8 in which said two actuators comprise two solenoids.

10. A mechanism for intermittently advancing a ribbon-like strip through an operating zone in the mechanism, comprising: take-up means to wind up the strip from said zone; means movable between an extended position to engage and immobilize the strip and a retracted position to free the strip for advance; means to engage said strip between said take-up means and said immobilizing means for movement from a first position to a second position to form a loop in the strip while said immobilizing means is retracted thereby to draw an increment of film through said zone; and means to actuate said immobilizing means and said loop-forming means through an operating cycle having a first stage in which said immobilizing means is extended and said loop forming means moves from its second position to its first position to permit said take-up means to take up an increment of the strip and a second stage in which said immobilizing means is retracted to free the strip and said loop-forming means moves from its first position to its second position to form a loop in the strip thereby to pull an increment of the strip through said zone.

11. A mechanism for intermittently advancing a ribbon-like strip through an operating zone, comprising: means movable from a retracted position to an extended position to releasably immobilize the strip in said zone; engagement means retractably extendible into releasable engagement with said strip and movable laterally from a first position to a second position to advance the strip by a given increment; a first electromagnetic means to move said engagement means from its second position to its first position; a first spring means to move said engagement means from its first position to its second position; a second electromagnetic means to extend said engagement means and retract said immobilizing means; a second spring means to retract said engagement means and extend said immobilizing means; means to energize said first electromagnetic means for a time period for operation thereof; means responsive to said first electromagnetic means near the end of its operation to energize said second electromagnetic means for the remainder of said time period; and means responsive to the operation of said engagement means by said first spring means to de-energize said second electromagnetic means to permit said second spring means to retract said engagement means and extend said immobilizing means.

12. A combination as set forth in claim 11 in which said first electromagnetic means and said first spring means comprise a first solenoid; said second electromagnetic means and said second spring means comprise a second solenoid; which includes a switch to energize said second solenoid; and in which said first solenoid has a lost motion connection with said switch for delayed closing of the switch when the first solenoid is energized and delayed opening of the switch when the first solenoid is de-energized.

13. Means for intermittently advancing a strip of ribbon-like material into an operating zone, comprising: rotary means engageable with said strip to advance the strip intermittently; a ratchet wheel connected to said rotary means for intermittent rotation thereof; a spring-pressed pawl in engagement with said ratchet wheel; a solenoid to reciprocate said pawl bodily between two positions spaced apart circumferentially of said ratchet wheel to rotate the ratchet wheel intermittently; a second pawl in engagement with said ratchet wheel to prevent reverse rotation thereof; an escapement wheel operatively connected to said ratchet wheel; a pair of pallets mounted on a common axis for cooperation with the escapement wheel; and means operatively connected to said solenoid to oscillate said pair of pallets when said drive pawl is reciprocated thereby to limit the advance of the ratchet wheel by each reciprocation of the drive pawl.

14. A mechanism for intermittently advancing a ribbon-like strip comprising means movable from a retracted position to an extended position to releasably engage and immobilize the strip; means to advance the strip by a given increment; a first rotary means movable about a given axis through a given arc to extend and retract said immobilizing means; a second rotary means movable about the same axis through a given arc to operate said advancing means; and two actuators to operate said first and second rotary means respectively, said two actuators being operatively connected to said two rotary means by a pair of shafts on said axis, one of said shafts being a tubular shaft concentric to the axis and the other shaft being a shaft inside the tubular shaft.

15. A combination as set forth in claim 14 in which said two actuators are two rotary solenoids concentric to said axis.

16. A camera mechanism for intermittently advancing a film past a lens aperture comprising: means movable from a retracted position to an extended position to releasably engage and immobilize the film; engagement means retractably extendible into engagement with the film and movable laterally from a first position to a second position to advance the film; a first solenoid means operable in one respect to move said engagement means from its second position to its first position and operable in the opposite respect to move said engagement means from its first position to its second position; a second solenoid means operable in one respect both to extend said engagement means and to retract said immobilizing means and operable in the opposite respect to retract said engagement means and extend said immobilizing means; means to operate said two solenoids in time sequence with the operation of the first solenoid means in its first respect overlapping the operation of the second solenoid means in its first respect and with the operation of the first solenoid in its second respect overlapping the operation of the second solenoid means in the second respect thereby carrying out an operating cycle of four stages, said immobilizing means being extended and said engagement means moving from its second position to its first position in the first stage of the cycle, said engagement means extending and said immobilizing means retracting during the second stage of the cycle, the extended engagement means moving from its first position to its second position to shift the strip while said immobilizing means is retracted during the third stage of the cycle, said immobilizing means extending and said engagement means retracting during the fourth stage of the cycle; and shutter means operable in time relation to said solenoid means to expose said film outisde the time period of said operating cycle.

17. A camera mechanism for intermittently advancing a film past a lens aperture comprising: means movable from a retracted position to an extended position to releasably engage and immobilize the film; engagement means retractably extendible into engagement with the film and movable laterally from a first position to a second position to advance the film; a first solenoid means operable in one respect to move said engagement means from its second position to its first position and operable in the opposite respect to move said engagement means from its first position to its second position; a second solenoid means operable in one respect both to extend said engagement means and to retract said immobilizing means and operable in the opposite respect to retract said engagement means and extend said immobilizing means; a control circuit to operate said two solenoid means in time sequence with the operation of the first solenoid means in its first respect overlapping the operation of the second solenoid means in its first respect and with the operation of the first solenoid means in its second respect overlapping the operation of the second solenoid means in its second respect, thereby carrying out an operating cycle of four stages, said immobilizing means being extended and said engagement means moving from its second position to its first position in the first stage of the cycle, said engagement means extending and said immobilizing means retracting during the second stage of the cycle, the extended engagement means moving from its first position to its second position to shift the strip while said immobilizing means is retracted during the third stage of the cycle, and said immobilizing means extending and said engagement means retracting during the fourth stage of the cycle; and flash means operated by said control circuit to expose said film immediately prior to initiation of said operating cycle.

18. A camera mechanism for intermittently advancing a film past a lens aperture comprising: means movable from a retracted position to an extended position to releasably immobilize the film; engagement means retractably extendible into engagement with the film and movable laterally from a first position to a second position to advance the film; a first solenoid means operable in one respect to move said engagement means from its second position to its first position and operable in the opposite respect to move said engagement means from its first position to its second position; a second solenoid means operable in one respect both to extend said engagement means and to retract said immobilizing means and operable in the opposite respect to retract said engagement means and extend said immobilizing means; a control circuit to operate said two solenoids in time sequence with the operation of the first solenoid means in its first respect overlapping the operation of the second solenoid means in its first respect and with the operation of the first solenoid in its second respect overlapping the operation of the second solenoid means in its second respect, thereby carrying out an operating cycle of four stages, said immobilizing means being extended and said engagement means moving from its second position to its first position in the first stage of the cycle, said engagement means extending and said immobiliziing means retracting during the second stage of the cycle, the extended engagement means moving from its first position to its second position to shift the film while said immobilizing means is retracted during the third stage of the cycle, said immobilizing means extending and said engagement means retracting during the fourth stage of the cycle; shutter means to expose said film; means to operate said shutter means; and means responsive to said shutter operating means to energize said control circuit for operation of said two solenoid means after the film is exposed.

19. A combination as set forth in claim 18 in which said shutter operating means is a solenoid; and which includes means responsive to the operation of said solenoid to energize said circuit.

20. A combination as set forth in claim 19 in which said first solenoid means responds to the operation of said shutter-operating solenoid and in which said second solenoid means responds to operation of said first solenoid means.

21. A combination as set forth in claim 18 in which each of said two solenoid means is a dual solenoid for electromagnetic actuation in both of its opposite respects.

22. A mechanism for intermittenly advancing a strip through an operating zone, comprising: means movable from a retracted position to an extended position to releasably engage and immobilize the strip; means including a claw retractably extendible into engagement with the strip and movable laterally from a first position to a second position to advance the strip; a first solenoid means operable in one respect to move said engagement means from its second position to its first position and operable in the opposite respect to move said engagement means from its first position to its second position; a second solenoid means operable in one respect both to extend said engagement means and to retract said immobilizing means and operable in the opposite respect to retract said engagement means and extend said immobilizing means; a control circuit to operate said two solenoids in time sequence with the operation of the first solenoid means in its first respect overlapping the operation of the second solenoid means in its first respect and with the operation of the first solenoid in its second respect overlapping the operation of the second solenoid means in its second respect, thereby carrying out an operating cycle of four stages, said immobilizing means being extended and said engagement means moving from its second position to its first position in the first stage of the cycle, said engagement means extending and said immobilizing means retracting during the second stage of the cycle, the extended engagement means moving from its first position to its second position to shift the strip while said immobilizing means is retracted during the third stage of the cycle and said immobilizing means extending and said engagement means retracting during the fourth stage of the cycle; a take-up reel to wind exposed film; sprocket means to engage the film between said claw and said take-up reel; ratchet means operated by one of said solenoid means to advance said sprocket means intermittently; power means; friction means operatively connecting said power means with said reel whereby the power means may be continuously energized to apply continuous yielding operating force to the reel with said ratchet means functioning as metering means to release increments of film to said reel.

23. In a mechanism for advancing a strip intermittently through an operating zone, the combination of: means movable from a retracted position to an extending position to releasably immobilize the strip in said zone; means retractably extendable into releasable engagement with said strip and movable laterally from a first position to a second position to advance the strip by a given increment; a first electromagnetic means operatively connected to said engagement means to move the engagement means from its second position to its first position; a second electromagnetic means operatively connected with said engagement means and said immobilizing means to extend the engagement means and retract the immobilizing means; a third electromagnetic means operatively connected to said engagement means to move the engagement means from its first position to its second position; a fourth electromagnetic means operatively connected to said engagement means and said immobilizing means to retract the engagement means and extend the immobilizing means; a first timing circuit to energize said first electromagnetic means for a predetermined first time period in response to a signal pulse; a second timing circuit responsive to said first timing circuit to energize said second electromagnetic means for a subsequent second time period; a third timing circuit responsive to said second timing circuit to energize said third electromagnetic means for a subsequent third time period; and a fourth timing circuit responsive to said third timing circuit to energize said fourth electromagnetic means for a subsequent fourth time period, each of said timing circuits including a corresponding monostable vibrator, the first monostable vibrator being responsive to said signal pulse to be triggered thereby, each of the other monostable vibrators being responsive to the preceding monostable vibrator to be triggered thereby.

24. In a mechanism for advancing a strip intermittently through an operating zone, the combination of: means movable from a retracted position to an extended position to releasably immobilize the strip in said zone; means retractably extendable into releasable engagement with said strip and movable laterally from a first position to a second position to advance the strip by a given increment; a first solenoid with a first armature operatively connected to said engagement means; a second solenoid with a second armature operatively connected to said engagement means and said immobilizing means; a first coil in said first solenoid to shift said first armature in one direction to move said engagement means from its second position to its first position; a second coil in said second solenoid to move said second armature in one direction to extend said engagement means and retract said immobilizing means; a third coil in said first solenoid to shift said first armature in the opposite direction to move said engagement means from its first position to its second position; a fourth coil in said second solenoid to move said second armature in the opposite direction to retract said engagement means and extend said immobilizing means; a control circuit to energize said four coils in sequence for predetermined timed periods; a first latch means to latch said first armature at its two opposite positions; and a second latch means to latch said second armature at the end of its two opposite positions, said first latch means being releasable in response to energization of either said first or third coils, said second latch means being releasable in response to energization of either of said second or fourth coils.

25. In an optical device arranged to feed and receive strip material through an operating zone, comprising reciprocating means movably mounted to engage and immobilize the strip material at a forward position thereof and to free the strip material for feeding at a retracted position thereof, advancing means to incrementally move the strip through said zone including an element rotatable about a fixed axis through a determined arcuate increment and arranged for extension and retraction transversely of said axis, a first means for rotational oscillative movement through a first determined arc and operatively connected to said reciprocating means to effect movement thereof between said forward and retracted positions, a second means for rotational and oscillative movement through a second determined arc operatively connected to said advancing means to effect movement of said element through said arcuate increment, said first means being operatively connected to said element to effect extension and retraction thereof, and an operative connection between said first means and said second means whereby a determined rotational oscillation of said first means initiates a delayed determined rotational oscillation of said second means, said first means including a first oscillative rotary solenoid, said second means comprising a second oscillative rotary solenoid, said operative connection comprising an electrical pulse control unit, lead connections between the unit and the respective solenoids, said unit being operative to sequentially energize the solenoids.

26. In an optical device arranged to feed and receive strip material through an operating zone, comprising reciprocating means movably mounted to engage and immobilize the strip material at a forward position thereof and to free the strip material for feeding at a retracted position thereof, advancing means to incrementally move the strip through said zone including an element rotatable about a fixed axis through a determined arcuate increment and arranged for extension and retraction transversely of said axis, a first means for rotational oscillative movement through a first determined arc and operatively connected to said reciprocating means to effect movement thereof between said forward and retracted positions, a second means for rotational and oscillative movement through a second determined arc operatively connected to said advancing means to effect movement of said element through said arcuate increment, said first means being operatively connected to said element to effect extension and retraction thereof, and an operative connection between said first means and said second means whereby a determined rotational oscillation of said first means initiates a delayed determined rotational oscillation of said second means, said first means including a first oscillative rotary solenoid, said second means comprising a second oscillative rotary solenoid, said operative connection comprising a switch electrically connected to the second solenoid, a pulse unit electrically connected to the first solenoid, said pulse unit being operative to energize the first solenoid, and a lost motion mechanical connection between the first solenoid and the switch whereby motion of said first solenoid initiates a delayed energizing of said second solenoid.

27. An optical device according to claim 26, and including a material feeding and receiving sheave, a direct mechanical connection between said second solenoid and said sheave whereby motion of said second solenoid induces a determined unidirectional angular rotation of said sheave.

28. An optical device according to claim 27, wherein said direct mechanical connection comprises a link connecting said second solenoid and a drive pawl, a ratchet wheel fixedly connected to the sheave, said pawl being engageable with said wheel and arcuately movable about the periphery thereof to rotate said wheel and sheave in response to solenoid induced motion of the link.

29. An optical device according to claim 28, and including dog means cooperating with said wheel to limit motion of said sheave to said determined unidirection.

30. An optical device according to claim 29, and including an escapement wheel fixedly connected to said sheave, and rockable pallet means engageable with said escapement wheel and rockably movable in response to said motion of said link to limit angular movement of said sheave in said unidirection to a determined amount incrementally.

31. An optical device according to claim 30, and including a reel to receive said strip material from said sheave, and a resilient belt operatively interconnecting the reel and sheave to induce incremental movement of the reel in response to incremental movement of the sheave.

32. In a mechanism for advancing a strip intermittently through an operating zone, the combination of:
  means movable from a retracted position to an extended position to releasably immobilize the strip in said zone;
  means retractably extendable into releasable engagement with said strip and movable laterally from a first position to a second position to advance the strip by a given increment;
  a first solenoid with a first armature operatively connected to said engagement means;
  a second solenoid with a second armature operatively connected to said engagement means and said immobilizing means;
  a first coil in said first solenoid to shift said first armature in one direction to move said engagement means from its second position to its first position;
  a second coil in said second solenoid to move said second armature in one direction to extend said engagement means and retract said immobilizing means;
  a third coil in said first solenoid to shift said first armature in the opposite direction to move said engagement means from its first position to its second position;
  a fourth coil in said second solenoid to move said second armature in the opposite direction to retract said engagement means and extend said immobilizing means;
  a first timing circuit to energize said first coil for a predetermined first time period;
  a second timing circuit responsive to said first timing circuit to energize said second coil for a subsequent second time period;

a third timing circuit responsive to said second timing circuit to energize said third coil for a subsequent third time period; and a fourth timing circuit responsive to said third timing circuit to energize said fourth coil for a predetermined time period, each of said timing circuits including a monostable multivibrator, the first monostable multivibrator being responsive to said signal pulse to be triggered thereby, each of the other monostable multivibrators being responsive to the preceding monostable multivibrator to be triggered thereby.

References Cited in the file of this patent

UNITED STATES PATENTS

| | | |
|---|---|---|
| 1,797,274 | Ross | Mar. 24, 1931 |
| 1,877,713 | Beck | Sept. 13, 1932 |
| 1,891,585 | Vinton | Dec. 20, 1932 |
| 1,954,885 | Mitchell et al. | Apr. 17, 1934 |
| 2,051,790 | Foster et al. | Aug. 18, 1936 |
| 2,231,384 | Goldberg | Feb. 11, 1941 |
| 2,233,839 | Heurtier | Mar. 4, 1941 |
| 2,463,043 | McClay | Mar. 1, 1949 |
| 2,588,813 | Dube | Mar. 11, 1952 |
| 2,651,964 | Doyle | Sept. 15, 1953 |
| 2,819,647 | Golick et al. | Jan. 14, 1958 |
| 2,909,096 | Barnett | Oct. 20, 1959 |